(12) United States Patent
Hu et al.

(10) Patent No.: US 10,042,240 B2
(45) Date of Patent: Aug. 7, 2018

(54) PROJECTION SYSTEM, LIGHT SOURCE SYSTEM AND LIGHT SOURCE ASSEMBLY

(71) Applicant: APPOTRONICS CHINA CORPORATION, Shenzhen (CN)

(72) Inventors: Fei Hu, Shenzhen (CN); Yi Li, Pleasanton, CA (US); Yi Yang, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 15/495,853

(22) Filed: Apr. 24, 2017

(65) Prior Publication Data

US 2017/0242327 A1 Aug. 24, 2017

Related U.S. Application Data

(63) Continuation of application No. 13/992,243, filed as application No. PCT/CN2011/083651 on Dec. 7, 2011, now Pat. No. 9,631,792.

(30) Foreign Application Priority Data

Dec. 8, 2010 (CN) .......................... 2010 1 0579909
Dec. 30, 2010 (CN) .......................... 2010 1 0624857
Jul. 8, 2011 (CN) .......................... 2011 1 0191454

(51) Int. Cl.
*G03B 21/14* (2006.01)
*G03B 21/20* (2006.01)
(Continued)

(52) U.S. Cl.
CPC ............. *G03B 21/204* (2013.01); *F21K 9/64* (2016.08); *F21S 10/007* (2013.01); *F21V 9/08* (2013.01);
(Continued)

(58) Field of Classification Search
CPC .. G03B 21/204; G03B 21/14; G03B 21/2066; G03B 21/28; G02B 26/008;
(Continued)

(56) References Cited

U.S. PATENT DOCUMENTS 7,700,928 B2 4/2010 Rasnow et al.
2005/0122485 A1* 6/2005 Kao .................. G03B 21/14
353/84

(Continued)

FOREIGN PATENT DOCUMENTS

CN 1327689 12/2001
CN 1888974 1/2007
(Continued)

OTHER PUBLICATIONS

International Search Report in the parent PCT application No. PCT/CN2011/083651, dated Mar. 15, 2012.
(Continued)

*Primary Examiner* — Sultan Chowdhury
*Assistant Examiner* — Magda Cruz
(74) *Attorney, Agent, or Firm* — Chen Yoshimura LLP

(57) ABSTRACT

Provided is a projection system, a light source system, and a light source assembly. The light source system (100) comprises an excitation light source (101), a wavelength conversion device (106), a color filtering device (107), a drive device (108), and a first optical assembly. The wavelength conversion device (106) comprises at least one wavelength conversion region. The optical filtering device (107) is fixed face-to-face with the wavelength conversion device (106), and comprises at least a first optical filtering region. The drive device (108) drives the wavelength conversion device (106) and the optical filtering device (107), allowing the wavelength conversion region and the first optical filtering region to act synchronously, and the wavelength
(Continued)

conversion region is periodically set on the propagation path of the excitation light, thereby converting the excitation light wavelength into converted light. The first optical assembly allows the converted light to be incident on the first optical filtering region. The first optical filtering region filters the converted light, so as to enhance the color purity of the converted light. The light source system is simple in structure, easy to implement, and highly synchronous.

18 Claims, 16 Drawing Sheets

(51) Int. Cl.
| | |
|---|---|
| F21K 9/64 | (2016.01) |
| F21V 9/08 | (2018.01) |
| H04N 9/31 | (2006.01) |
| G03B 21/28 | (2006.01) |
| G02B 26/00 | (2006.01) |
| F21V 13/08 | (2006.01) |
| F21S 10/00 | (2006.01) |
| F21V 9/10 | (2006.01) |
| F21V 9/16 | (2006.01) |
| F21Y 115/00 | (2016.01) |

(52) U.S. Cl.
CPC ............... *F21V 9/10* (2013.01); *F21V 13/08* (2013.01); *G02B 26/008* (2013.01); *G03B 21/14* (2013.01); *G03B 21/2066* (2013.01); *G03B 21/28* (2013.01); *H04N 9/315* (2013.01); *H04N 9/3114* (2013.01); *H04N 9/3117* (2013.01); *H04N 9/3155* (2013.01); *F21V 9/16* (2013.01); *F21Y 2115/00* (2016.08)

(58) Field of Classification Search
CPC ........... H04N 2209/043; H04N 9/3114; H04N 9/315; H04N 9/3117; H04N 9/3155; G02F 2002/006; F21V 9/08; F21V 13/08; F21V 9/10; F21S 10/007
See application file for complete search history.

(56) References Cited

U.S. PATENT DOCUMENTS

| | | | |
|---|---|---|---|
| 2006/0126198 A1* | 6/2006 | Niwa | G02B 26/008 359/892 |
| 2008/0179539 A1 | 7/2008 | Rasnow et al. | |
| 2009/0034284 A1* | 2/2009 | Li | G03B 21/204 362/554 |
| 2009/0310090 A1 | 12/2009 | Ho et al. | |
| 2010/0193705 A1 | 8/2010 | Rasnow et al. | |
| 2010/0328628 A1* | 12/2010 | Masuda | G02B 26/008 353/85 |
| 2012/0068630 A1 | 3/2012 | Li et al. | |
| 2013/0250546 A1 | 9/2013 | Hu et al. | |
| 2013/0271954 A1 | 10/2013 | Li et al. | |

FOREIGN PATENT DOCUMENTS

| | | |
|---|---|---|
| CN | 101604057 | 12/2009 |
| CN | 101893204 | 11/2010 |
| CN | 102063002 A | 5/2011 |
| CN | 202109406 U | 1/2012 |
| CN | 102566230 | 7/2012 |
| JP | 2004317528 | 11/2004 |
| JP | 2006133357 A | 5/2006 |
| JP | 2007-156270 | 6/2007 |
| JP | 2007-200782 | 8/2007 |
| JP | 2008-52070 | 3/2008 |
| WO | 2008091425 | 7/2008 |
| WO | 2010133090 | 11/2010 |

OTHER PUBLICATIONS

IPRP in the parent PCT application No. PCT/CN2011/083651, dated Jun. 12, 2013.
Chinese Office Action, dated Aug. 20, 2014, in counterpart Chinese patent application No. CN 2011101914548.
Chinese Office Action, dated Jun. 28, 2016, in related Chinese patent application, No. CN 201510310317.X.
Chinese Office Action, dated Apr. 6, 2016, in related Chinese patent application, No. CN 201510308569.9.
Chinese Office Action, dated May 5, 2016, in related Chinese patent application, No. CN 201510310042.X.
Chinese Office Action, dated May 5, 2016, in related Chinese patent application, No. CN 201510310041.5.
Chinese Office Action, dated Jan. 19, 2017, in related Chinese patent application, No. CN 201510310317.X.
Chinese Office Action, dated Nov. 24, 2016, in related Chinese patent application, No. CN 201510308569.9.
Chinese Office Action, dated Jan. 19, 2017, in related Chinese patent application, No. CN 201510310042.X.
Chinese Office Action, dated Jan. 20, 2017, in related Chinese patent application, No. CN 201510310041.5.

* cited by examiner

PROJECTION SYSTEM, LIGHT SOURCE SYSTEM AND LIGHT SOURCE ASSEMBLY

FIELD OF THE INVENTION

This invention relates to the field of light source used in illumination and display, and in particular, it relates to projection system, light source system and light source assembly.

DESCRIPTION OF THE RELATED ART

Currently, projectors are widely used in various applications, including playing movies, meeting and public events, etc. Phosphor color wheels are often used as the light source of projectors for providing a color light sequence. In such a device, different segments of the phosphor color wheel are alternately and periodically provided in the propagation path of the excitation light, on which the phosphor material coated are excited by the excitation light in order to generate color fluorescent light. However, because the spectral range of the fluorescent light generated by the phosphor material is wide, the color purity of the fluorescent light is poor, which result in an insufficient color gamut of the light source. In this case, color filters are needed to filter the fluorescent light, so that the color purity of the fluorescent light can be improved. However, because the spectral ranges of different colored fluorescent light are partly overlapped, they cannot be filter using a same color filter, so that different colored fluorescent light needs different color filter. In a conventional device, a color filter wheel composed of different color filters is provided in the entrance of the light homogenization rob, and a driving device of the color filter wheel and a driving device the phosphor color wheel are synchronized by electronic circuits. The above method has the following disadvantages: the structure is complex, it is difficult to achieve, and the synchronization effect is poor.

As the projector industry is increasingly competitive, manufacturers have to improve the quality of the projector to enhance their competitiveness. The inventors of the present invention in the process of actively seeking to improve the quality of the projector found that: in the prior art, the synchronization architecture of the phosphor color wheel and the color filter wheel of the projector light source has the technical problem: the structure is complex, it is difficult to achieve, and the synchronization effect is poor.

So, a projection system, a light source system and the light source devices are needed to solve the above technical problem existing in the synchronization architecture of the phosphor color wheel and the color filter wheel of the projector light source in the prior art.

SUMMARY OF THE INVENTION

The present invention seeks to solve the problem by providing a projection system, a light source system and light source assembly to simplify the synchronization architecture of the wavelength conversion device and the color filtering device, and improve the synchronization effect.

To solve the above problem, the present invention adopts a technical solution: providing a light source system, which includes an excitation light source, a wavelength conversion device, a color filter device, a driving device and a first optical assembly. The excitation light source is for generating an excitation light. The wavelength conversion device includes at least one wavelength conversion area. The color filter device is fixed with respected to the wavelength conversion device, and includes at least one color filter area. The driving device is for driving the color filter device and the wavelength conversion device and makes them move synchronously. The wavelength conversion areas are provided in the propagation path of the excitation light periodically in order to convert the excitation light into converted light. The first optical assembly is used to guide the converted light to the first color filter area, and the first color filter area filters the converted light to improve its color purity.

In some embodiments, the wavelength conversion device and the color filter device are two ring structures fixed coaxially.

In some embodiments, the driving device is a rotation device with a rotating shaft, and the two ring structures are coaxially fixed to the rotating shaft.

In some embodiments, the wavelength conversion area and the first color filter area are located at 180-degree angle from each other with respect to a centre of the two ring structures. A light spot formed by the excitation light on the wavelength conversion device and a light spot formed by the converted light on the color filter device after being directed by the first optical assembly are located at 180-degree angle from each other with respect to the center of the two ring structures.

In some embodiments, the wavelength conversion area and the first color filter area are located at 0-degree angle from each other with respect to a center of the two ring structures. A light spot formed by the excitation light on the wavelength conversion device and a light spot formed by the converted light on the color filter device after being directed by the first optical assembly are located at 0-degree angle from each other with respect to the center of the two ring structures.

In some embodiments, the wavelength conversion device and the color filter device are spaced apart along an axial direction of the driving device; the first optical assembly includes at least one light collecting device disposed between the wavelength conversion device and the color filter device; and the light collecting device collects the converted light so that an energy of the converted light incident on the color filter device with less than or equal to 60-degree incident angles is more than 90% of a total energy of the converted light.

In some embodiments, the wavelength conversion area reflects the converted light so that a direction of the converted light emitted from the wavelength conversion area is opposite to a direction of the excitation light incident on the wavelength conversion area.

In some embodiments, the wavelength conversion area transmits the converted light so that a direction of the converted light emitted from the wavelength conversion area is the same as a direction of the excitation light incident on the wavelength conversion area.

In some embodiments, the first optical assembly includes at least one light collecting device which collects the converted light so that an energy of the converted light incident on the color filter device with less than or equal to 60-degree incident angles is more than 90% of a total energy of the converted light.

In some embodiments, the first optical assembly includes at least one reflecting device which reflects the converted light to change a propagation direction of the converted light, and the reflecting device is a planar reflecting device or a semi-ellipsoidal or hemispherical reflecting device with a reflecting surface facing inside.

In some embodiments, the planar reflecting device includes a dichroic mirror or a reflecting mirror.

In some embodiments, the semi-ellipsoidal or hemispherical reflecting device with the reflecting surface facing inside is provided with a light entrance port through which the excitation light is incident on the wavelength conversion device.

In some embodiments, the wavelength conversion device further includes a first light transmission area which is periodically disposed in the propagation path of the excitation light under the driving of the driving device and which transmits the excitation light.

In some embodiments, the system further includes a second optical assembly which combines the excitation light transmitted by the first light transmission area and the converted light filtered by the first color filter area.

In some embodiments, the color filter device includes a second light transmission area or a second color filter area, and the first optical assembly guides the excitation light transmitted by the first light transmission area, along the same propagation path of the converted light, to the second light transmission area or the second color filter area to be transmitted or filtered.

In some embodiments, the system further includes an illumination light source which generates an illumination light; the wavelength conversion device further includes a first light transmission area which is periodically disposed in a propagation path of the illumination light under the driving of the driving device, the first light transmission area transmitting the illumination light; the color filter device further includes a second light transmission area or a second color filter area; and the first optical assembly guides the illumination light transmitted by the first light transmission area, along the same propagation path of the converted light, to the second light transmission area or the second color filter area to be transmitted or filtered.

In some embodiments, the system further includes: an illumination light source generating an illumination light, and a second optical assembly which combines the illumination light and the converted light filtered by the first color filter area into one beam of light.

In some embodiments, the wavelength conversion device is a cylindrical structure and the color filter device is a ring structure which is coaxial fixed with the cylindrical structure so that they rotate coaxially and synchronously under the driving of the driving device.

In some embodiments, the wavelength conversion area is provided on an outer surface of a sidewall of the cylindrical structure and reflects the converted light, and the first color filter area is provided on the ring structure located outside of the cylindrical structure to receive the converted light.

In some embodiments, the wavelength conversion device and the color filter device are two cylindrical structures coaxially fixed and nested within each other to rotate coaxially and synchronously under the driving of the driving device; the wavelength conversion area and the first color filter area are respectively provided on sidewalls of the two cylindrical structure; and the converted light is transmitted by the wavelength conversion area and incident on the first color filter area.

In some embodiments, the wavelength conversion device and the color filter device are two strip structures adjoined side by side, on which the wavelength conversion area and the first color filter area are provided side by side, the two strip structures move in an oscillating linear translational motion under the driving of the driving device.

The present invention also provides a source module, which includes: wavelength conversion device including at least one wavelength conversion area, and a color filter device fixed with respected to the wavelength conversion device and including at least one color filter, where the wavelength conversion area and the color filter area move synchronously under the driving of a driving device.

In some embodiments, the wavelength conversion device and the color filter device are two ring structures fixed coaxially.

In some embodiments, the wavelength conversion device is a cylindrical structure and the color filter device is a ring structure which is fixed coaxially with the cylindrical structure.

In some embodiments, the wavelength conversion area is provided on an outer surface of a sidewall of the cylindrical structure, and the color filter area is provided on the ring structure located outside of the cylindrical structure.

In some embodiments, the wavelength conversion device and the color filter device are two cylindrical structures which are fixed coaxially and nested within each other, and the wavelength conversion area and the color filter area are provided on sidewalls of the two cylindrical structures respectively.

In some embodiments, the wavelength conversion device and the color filter device are two strip structures adjoined side by side, on which the wavelength conversion area and the color filter area are provided side by side.

The present invention also provides a projection system, which includes a light source system described above.

The advantage of the present invention is: different from the prior art, in the projection system, the light source system and the light source assembly of the present invention, the color filter device and the wavelength conversion device are fixed with each other, and driven by the same driving device, which can bring the advantages: the structure is simple, it is easy to implement, and the synchronization effect is excellent.

DETAILED DESCRIPTION OF THE PREFERRED EMBODIMENTS

Figure 1:
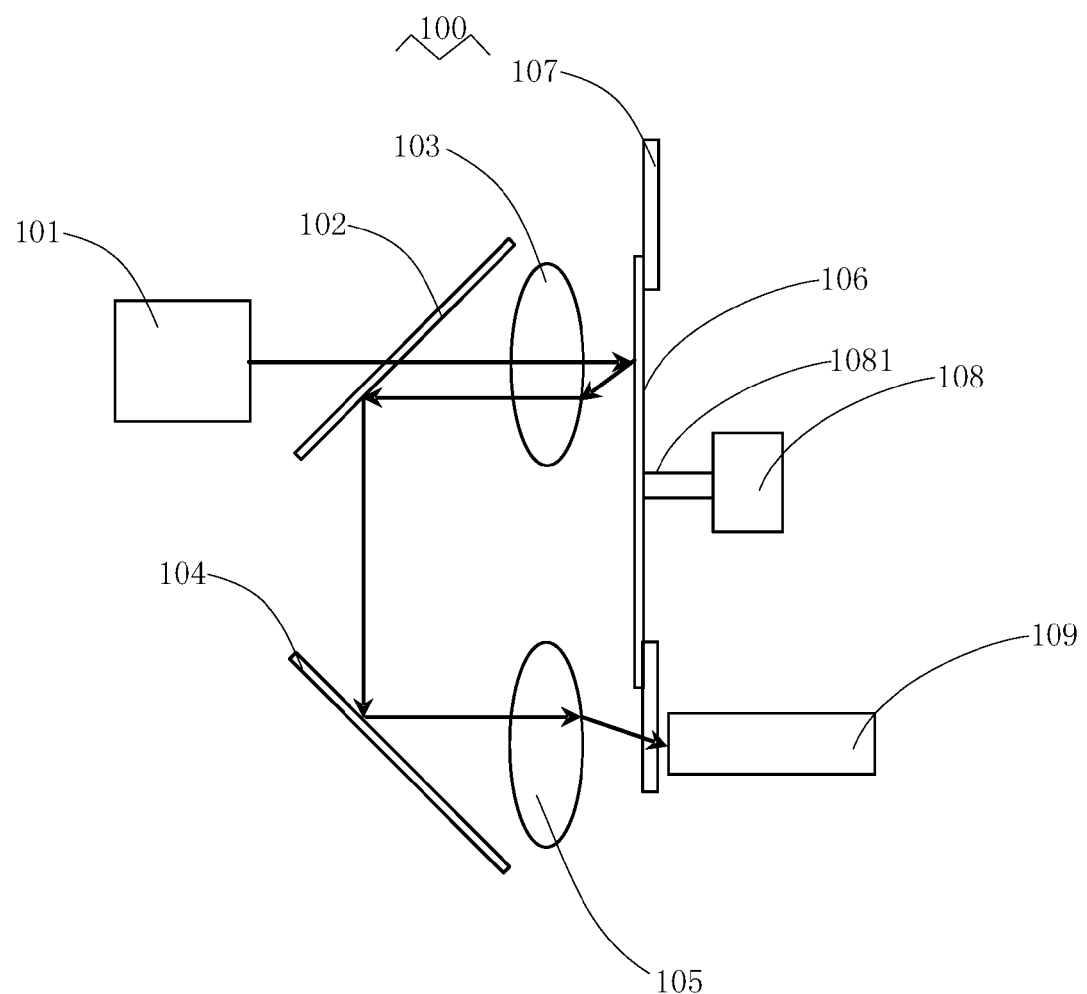
FIG. 1 illustrates the structure of a light source system according to a first embodiment of the present invention.
Figure 2:
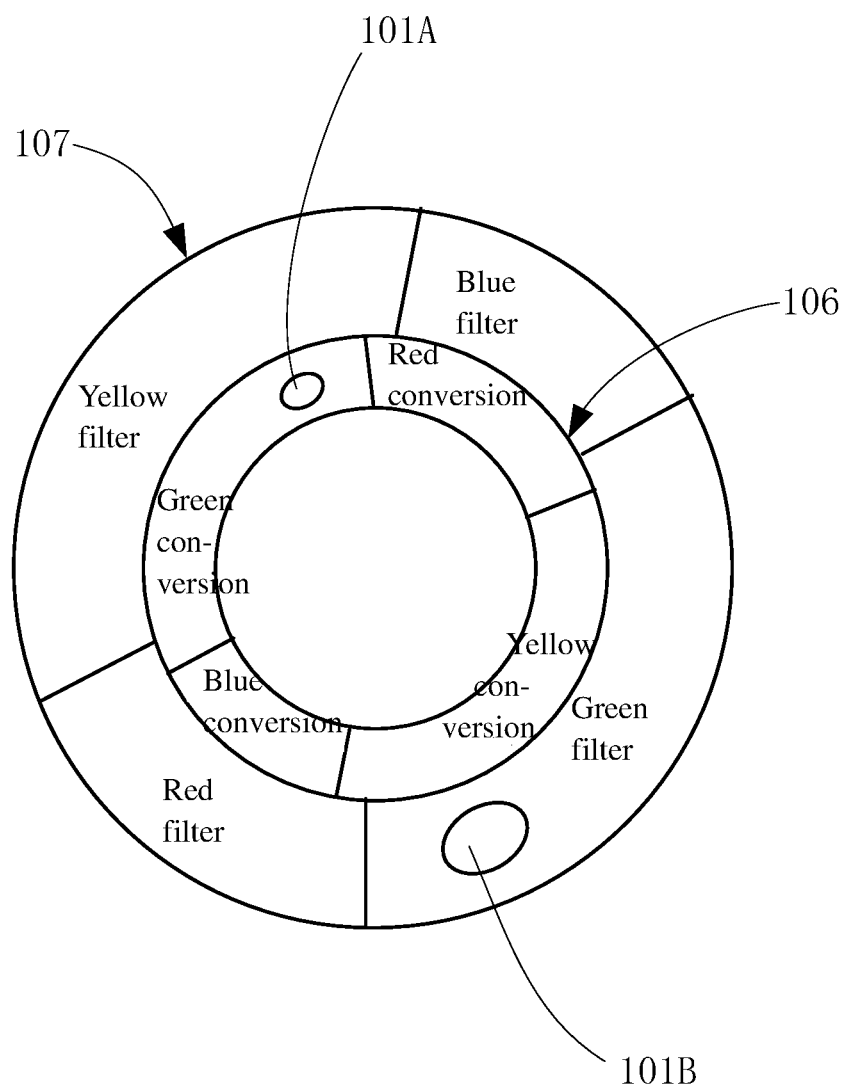
FIG. 2 is a front view of the wavelength conversion device and the color filter device of the light source system shown in FIG. 1.

Referring to FIG. 1 and FIG. 2, FIG. 1 illustrates the structure of a light source system according to a first embodiment of the present invention, and FIG. 2 is a front view of the wavelength conversion device and the color filter device in the light source system shown in FIG. 1. As show in FIG. 1, the light source system in this embodiment mainly includes an excitation light source 101, a dichroic mirror 102, a mirror 104, lenses 103 and 105, a wavelength conversion device 106, a color filter device 107, a driving device 108 and a light homogenization device 109.

The excitation light source 101 is for generating an excitation light. In this embodiment, the excitation light source 101 is ultraviolet or near-ultraviolet laser diode or ultraviolet or near-ultraviolet light emitting diode, in order to generate ultraviolet or near-ultraviolet excitation light.

As show in FIG. 2, the wavelength conversion device 106 has a ring structure, including at least one wavelength conversion area. In the present embodiment, the wavelength conversion device 106 includes a red wavelength conversion area, a green wavelength conversion area, a blue wavelength conversion area and a yellow wavelength conversion area, which are provided in circumferential subsections of the ring structure. Different wavelength conversion materials are coated on the wavelength conversion areas respectively (for example, phosphor materials or nanomaterials). The wavelength conversion materials can convert the ultraviolet or near-ultraviolet excitation light that illuminate them into the converted light of corresponding color. Specifically, the red wavelength conversion area converts the ultraviolet or near-ultraviolet excitation light incident to it into red converted light, the green wavelength conversion area converts the ultraviolet or near-ultraviolet excitation light incident to it into green converted light, the blue wavelength conversion area converts the ultraviolet or near-ultraviolet excitation light incident to it into blue converted light, and the yellow wavelength conversion area converts the ultraviolet or near-ultraviolet excitation light incident to it into yellow converted light. In the present embodiment, a reflective substrate is provided under the wavelength conversion materials in order to reflect the converted light generated by the wavelength conversion materials, so that the exit direction of the converted light output from the wavelength conversion area is opposite to the incident direction of the excitation light incident to the wavelength conversion area.

As show in FIG. 2, the color filter device 107 has a ring structure, coaxially fixed with the wavelength conversion device 106, and disposed outside the ring of the wavelength conversion device 106. In other embodiments, the color filter device 107 can also be disposed inside the ring of the wavelength conversion device 106. The color filter device 107 includes at least one color filter area. In the present embodiment, the color filter device 107 includes a red filter area, a green filter area, a blue filter area and a yellow filter area, which are provided in circumferential subsections of the ring structure. Each color filter area corresponds to a wavelength conversion area of the wavelength conversion device 106. In the present embodiment, the color filter area and the wavelength conversion area of the same color are set at a 180-degree angle from each other with respect to the center of the ring structures of the wavelength conversion device 106 and the color filter device 107. The different color filter areas have different spectral responses, and filter the converted light of corresponding colors, in order to improve the color purity of the converted lights.

Of course, the color filter area and the wavelength conversion area of the same color can be set at angles with respect to the center of the ring structures of the wavelength conversion device 106 and the color filter device 107.

As show in FIG. 1, the driving device 108 is a rotary device which has a rotary shaft 1081, for example, a rotary motor. The wavelength conversion device 106 and the color filter device 107 are coaxially fixed on the rotary shaft 1081, and rotate synchronously under the driving of the rotary shaft 1081.

In the working process of the light source system 100 shown in FIG. 1, the ultraviolet or near-ultraviolet excitation light generated by the excitation light source 101 is transmitted through the dichroic mirror 102, converged by the lens 103, incident on the wavelength conversion device 106, to form a light spot 101A on the wavelength conversion device 106 as shown in FIG. 2. The wavelength conversion device 106 and the color filter device 107 rotate synchronously under the driving of the driving device 108, so that the wavelength conversion areas of the wavelength conversion device 106 and the color filter areas of the color filter device 107 can rotate synchronously. When the wavelength conversion device 106 and the color filter device 107 rotate, the wavelength conversion areas of the wavelength conversion device 106 are disposed in the propagation path of the ultraviolet or near-ultraviolet excitation light generated by the excitation light source 101 sequentially and periodically, so that the ultraviolet or near-ultraviolet excitation light can be converted into the converted light of different colors sequentially by the respective wavelength conversion areas. The converted lights of different colors are further reflected by the wavelength conversion areas respectively, guided by the first optical assembly which is composed of lenses 103 and 105, dichroic mirror 102, and reflecting mirror 104, then incident on the light filer device 107 and form a light spot 101B as shown in FIG. 2.

In the first optical assembly, the lenses 103 and 105 are used for collecting and condensing the converted light respectively, so that the divergence angle of the converted light can be decreased. The dichroic mirror 102 and the reflecting mirror 104 are used for reflecting the converted light, so that the propagation direction of the converted light can be changed. In the present embodiment, the dichroic mirror 102 and the reflecting mirror 104 are set at a 90-degree angle to each other and 45-degree angle to the incident direction of the converted light. In the present embodiment, because of the reflection of the dichroic mirror 102 and the reflecting mirror 104, the propagation direction of the converted light is shifted by a predetermined distance and inverted by 180-degree angle, and the light spot 101A is set at 180-degree angle to the light spot 101B with respect to the center of the ring structures of the wavelength conversion device 106 and the color filter device 107.

In this case, the wavelength conversion device 106 is fixed with respect to the color filter device 107, and the wavelength conversion areas of the wavelength conversion device 106 and the color filter areas of the color filter device 107 with the same colors are set at 180-degree angle from each other with respect to the center of the ring structures of the wavelength conversion device 106 and the color filter device 107 and rotate synchronously, so that the converted light of different colors generated by the wavelength conversion areas of the wavelength conversion device 106 are incident on the color filter areas of the color filter device 107 with the same colors after they pass through the dichroic mirror 102 and the reflecting mirror 104, and the color purity is improved by the color filter area with the same color filtering the light. After filtering by the color filter area of the color filter device 107, the converted light then is incident on the light homogenization device 109 to be made uniform.

In the light source system 100 of the present embodiment, the wavelength conversion device 106 and the color filter device 107 are fixed with respect to each other and driven synchronously by the same driving device. At the same time, the wavelength conversion area and the color filter area of the same color are synchronized by the first optical assembly. It has the advantages that: the structure is simple, it is easy to implement and the synchronization effect is excellent. In addition, each element of the first optical assembly is stationary with respect to the excitation light source, and do not rotate with the rotation of the wavelength conversion device 106 and the color filter device 107, so the optical stability is improved.

Further, since the converted light generated through wavelength conversion generally has an approximately Lambertian distribution, if the converted light is directly incident on the color filter area, the incident angle will be distributed in the range of 0 degree to 90 degrees. However, the transmittance of the color filter area will shift with the increase of the incident angle, so in the present embodiment, the first optical assembly further includes a light convergence device (for example, a lens 105) to converge the converted light, which can decrease the incident angle of the converted light incidence on the color filter area and further improve the color filter effect. In a preferred embodiment, by adjusting the first optical assembly, the energy of the converted light that is incident on the light filter 107 with incident angles less than or equal to 60 degrees can be more than 90% of the total energy of the converted light. In the present embodiment, the dichroic mirror 102 and the reflecting mirror 104 can be replaced by other forms of planar reflecting device, and the lenses 103 and 105 can be replaced by other forms of optical devices. For example, the lens 105 may be replaced by various forms of light convergence devices like a solid or hollow tapered light guide, a lens or lens group, a hollow or solid composite light condenser, or a curved reflecting mirror, etc.

In addition, in the present embodiment, the wavelength conversion areas of the wavelength conversion device 106 can be a combination of one or more of the red wavelength conversion area, the green wavelength conversion area, the blue wavelength conversion area and the yellow wavelength conversion area, and the excitation light source can be another suitable light source. Alternatively, those skilled in the art can select the wavelength conversion area and the excitation light source with other colors as desired. In this case, the color filter areas of the color filter device 107 are configured according to the colors of the converted light generated by the wavelength conversion areas of the wavelength conversion device 106, and the present invention shall not be limited to any specific arrangement.

Figure 3:
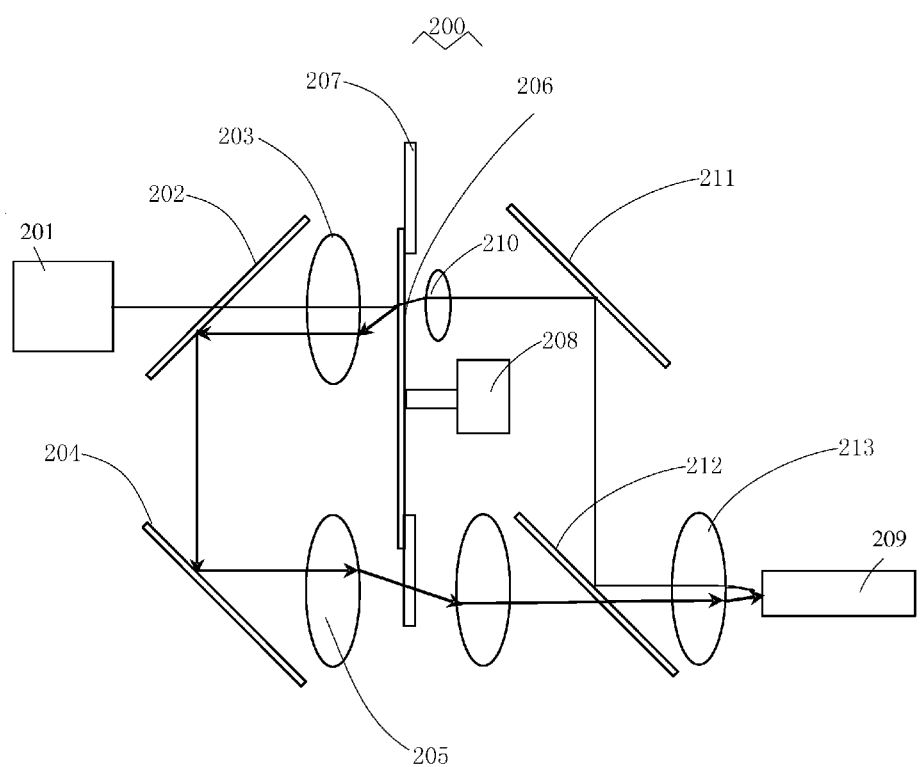
FIG. 3 illustrates the structure of a light source system according to a second embodiment of the present invention.
Figure 4:
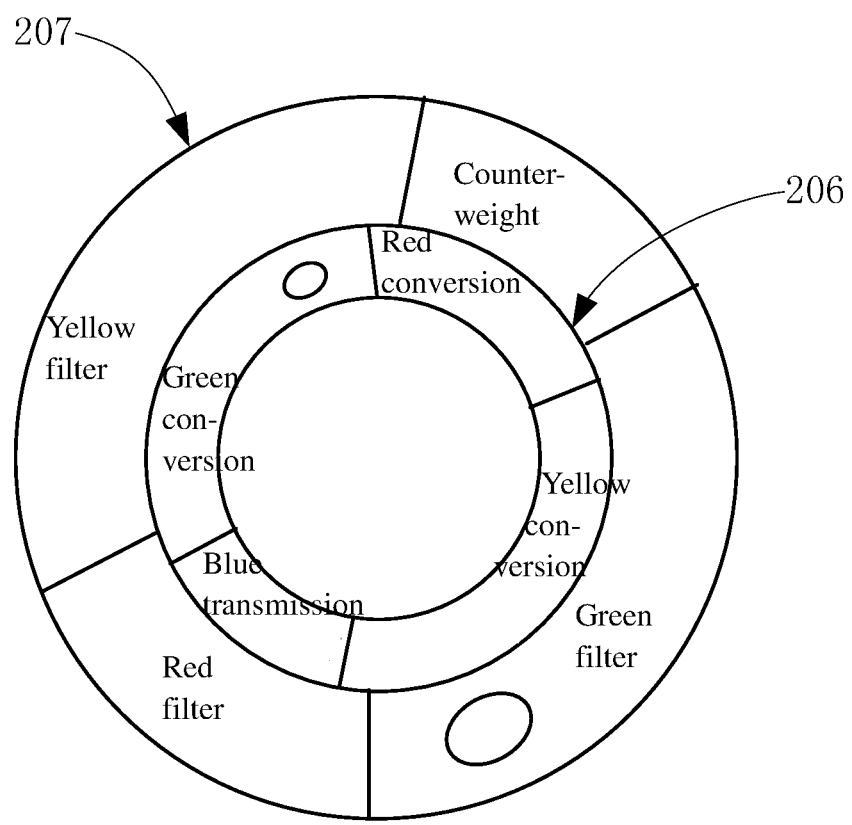
FIG. 4 is a front view of the wavelength conversion device and the color filter device of the light source system shown in FIG. 3.

Referring to in FIG. 3 and FIG. 4, FIG. 3 is a schematic structural view of the second embodiment of the light source system of the present invention, and FIG. 4 is a front view of the wavelength conversion device and the color filter device of the light source system shown in FIG. 3. The light source system 200 of the present embodiment and the light source system 100 as shown in FIG. 1 and FIG. 2 differ in that: the excitation light source 201 is a blue laser or blue light-emitting diode in order to generate a blue excitation light. As show in FIG. 4, in the present embodiment, besides of a red wavelength conversion area, a yellow wavelength conversion area and a green wavelength conversion area, the wavelength conversion device 206 further includes a blue light transmission area. The color filter device 207 includes a red color filter area, a yellow color filter area and a green color filter area. In the present embodiment, the area of the color filter device 207 which is corresponding to the blue light transmission area of the wavelength conversion device 206 is not required to have a particular optical property, and it can be provided as a counterweight balance area for rotation balance, so it should have the same or similar weight as the other color filter areas. In the present embodiment, the wavelength conversion device 206 and the color filter device 207 rotate synchronously under the driving of the driving device 208, so that the wavelength conversion areas and the blue light transmission area of the wavelength conversion device 206 are sequentially and periodically disposed in the propagation path of the blue excitation light generated by the excitation light source 201. The wavelength conversion areas convert the blue excitation light incident on them into the converted light of corresponding colors and reflect them, and the blue light transmission area transmits the blue excitation light incident on it. The blue light transmission area can be provided with appropriate scattering materials to destroy the collimation of the blue excitation light. The converted light reflected by the wavelength conversion device 206 is guided by the first optical assembly comprised of lenses 203 and 205, dichroic mirror 202 and reflecting mirror 204 and incident on the color filter area of corresponding color on the color filter device 207, so that it is filtered by the color filter area to improve its color purity. The blue excitation light transmitted by the wavelength conversion device 206 is guided by the second optical assembly comprised of lenses 210 and 213, reflecting mirror 211 and dichroic mirror 212, and is combined with the converted light filtered by the color filter device 207 into one light beam, which is incident on the light homogenization device 209 to be made uniform.

Of the second optical assembly, the lenses 210 and 213 are used for collecting and converging the blue excitation light transmitted by the wavelength conversion device 206, and the reflecting mirror 211 and the dichroic mirror 212 are used to reflect the blue excitation light transmitted by the wavelength conversion device 206 to change its propagation path. In the present embodiment, the reflecting mirror 211 and the dichroic mirror 212 are arranged in parallel with each other and they are set at 45 degrees to the incident direction of the blue excitation light so that the propagation direction of the blue excitation light is shifted by a predetermined distance but its propagation direction remains the same.

In the present embodiment, the blue excitation light generated by the excitation light source 201 is directly outputted as the blue light through transmission. In the present embodiment, the reflecting mirror 211 and the dichroic mirror 212 can be replaced by other forms of planar reflecting devices, and the lenses 210 and 213 can be replaced by other forms of optical devices. In addition, the above-described structure is also applicable to the light source system in which excitation light sources of other colors are used.

Figure 5:
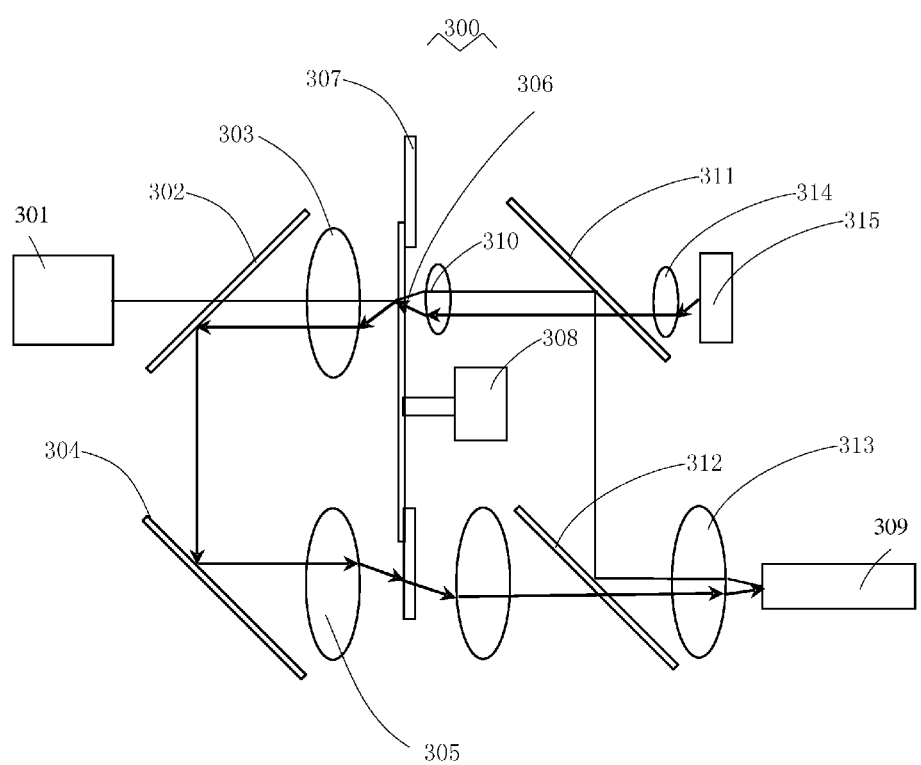
FIG. 5 illustrates the structure of a light source system according to a third embodiment of the present invention.
Figure 6:
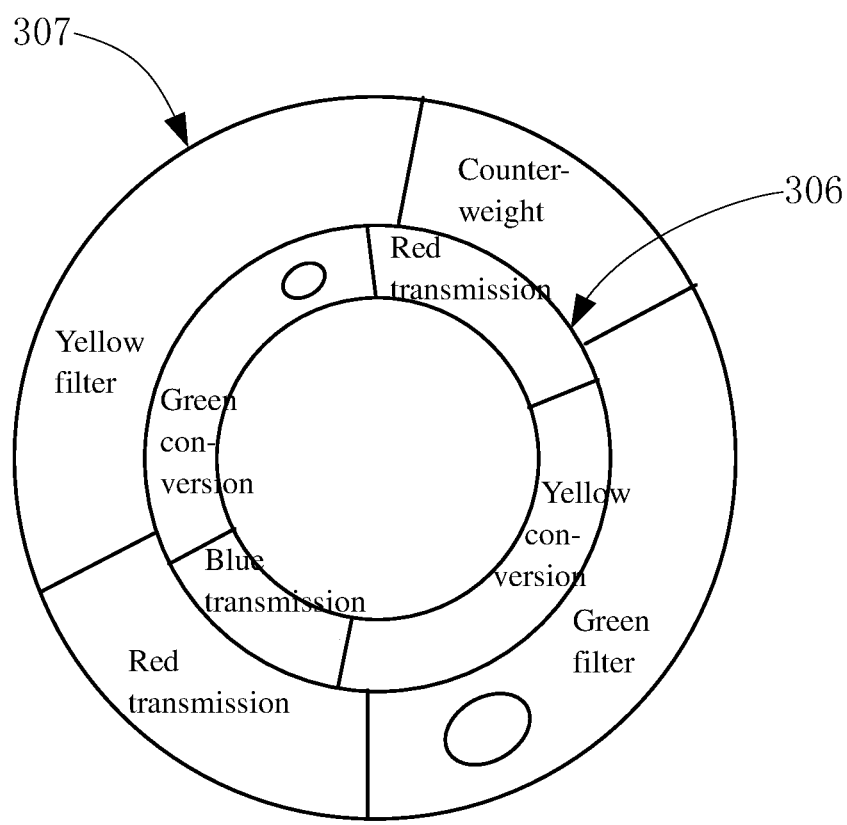
FIG. 6 is a front view of the wavelength conversion device and the color filter device of the light source system shown in FIG. 5.

Referring to FIG. 5 and FIG. 6, FIG. 5 is a schematic structural view of the light source system according to the third embodiment of the present invention, FIG. 6 is a front view of the wavelength conversion device and the color filter device of the light source system shown in FIG. 5. The light source system 300 of the present embodiment and the light source system 200 shown in FIG. 3 and FIG. 4 differ in that: the light source 300 further includes. in addition to the excitation light source 301, a red illumination light source 315 (for example, a red laser or a red light emitting diode) in order to generate a red illumination light. The red illumination light source 315 and the excitation light source 301 are respectively provided on the opposite sides of the wavelength conversion device 306 and the color filter device 307. The red illumination light generated by the red illumination light source 315 passes through the lens 314, the dichroic mirror 311, the lens 310 to be incident on the wavelength conversion device 306; its incident direction is opposite to that of the excitation light generated by the excitation light source 301.

In the present embodiment, the wavelength conversion device 306 includes a red light transmission area, a yellow wavelength conversion area, a green wavelength conversion area and a blue light transmission area. The color filter device 307 includes a red light transmission area, a yellow color filter area, a green color filter area and a counterweight balance area. In the present embodiment, under the driving of the driving device 308, the wavelength conversion device 306 and the color filter device 307 rotate synchronously, so that the wavelength conversion areas, the red light transmission area and the blue light transmission area of the wavelength conversion device 306 are disposed in the propagation path of the blue excitation light generated by the excitation light source 301 and the red illumination light generated by the red illumination light source 315 sequentially and periodically. The various wavelength conversion areas convert the blue excitation light incident on them into the converted light of corresponding color and reflect it, the blue light transmission area transmits the blue excitation light incident on it, and the red light transmission area transmits the red illumination light incident on it. The blue light transmission area and the red light transmission area can be provided with appropriate scattering materials to destroy the collimation of the blue excitation light and the red illumination light. The converted light reflected by the wavelength conversion device 306 is guided by the first optical assembly comprised of lenses 303 and 305, dichroic mirror 302 and reflecting mirror 304 and incident on the color filter area of corresponding color on the color filter device 307, so that it is filtered by the color filter area to improve its color purity. The red illumination light transmitted by the wavelength conversion device 306 is guided by the first optical assembly comprised of lens 303 and 305, dichroic mirror 302 and reflecting mirror 304 and incident to the red light transmission area of the color filter device 307 along the same propagation path of the converted light, then transmitted by the red light transmission area. The blue excitation light transmitted by the wavelength conversion device 306 is guided by the second optical assembly comprised of lenses 310 and 313, dichroic mirrors 311 and 312, and combined with the converted light filtered by the color filter device 307 and the red illumination light transmitted by the color filter device 307 into one light beam, which is incident on the light homogenization device 309 to be made uniform.

In a preferred embodiment, in order to ensure that the light homogenization device 309 receives only one color light at any time, the rotation position of the wavelength conversion device 306 is detected, and a synchronization signal is generated based on the detection. The excitation light source 301 and the red illumination light source 315 are turned on and off in a time-division manner according to the synchronization signal. Specifically, the red illumination light source 315 is turned on only when the red light transmission area is in the propagation path of the red illumination light generated by the red illumination light source 315, and is turned off when the yellow wavelength conversion area, the green wavelength conversion area and the blue light transmission area are in the propagation path of the red illumination light. The excitation light source 301 is turned on only when the yellow wavelength conversion area, the green wavelength conversion area and the blue light transmission area are in the propagation path of the blue excitation light generated by the blue excitation light source, and is turned off when the red light transmission area is in the propagation path of the blue excitation light. In addition, in another preferred embodiment, a dichroic filter which transmits the red illumination light and reflects the blue excitation light can be provided in the red light transmission area, a reflecting mirror which reflects the red illumination light can be provided for the yellow wavelength conversion area and the green wavelength conversion area on the side facing the red illumination light source 315, and a dichroic filter that transmits the blue excitation light and reflects the red illumination light can be provided in the blue light transmission area.

In the present embodiment, the red light outputted from the light source system 300 is supplied directly by the red illumination light source 315, which can avoid the problem of low conversion efficiency of the red wavelength conversion material. Of course, when it needs to improve the color purity, the red light transmission area can be replaced by a red color filter area. In the present embodiment, those skilled in the art can use other illumination light source to generate the illumination light of other colors.

Figure 7:
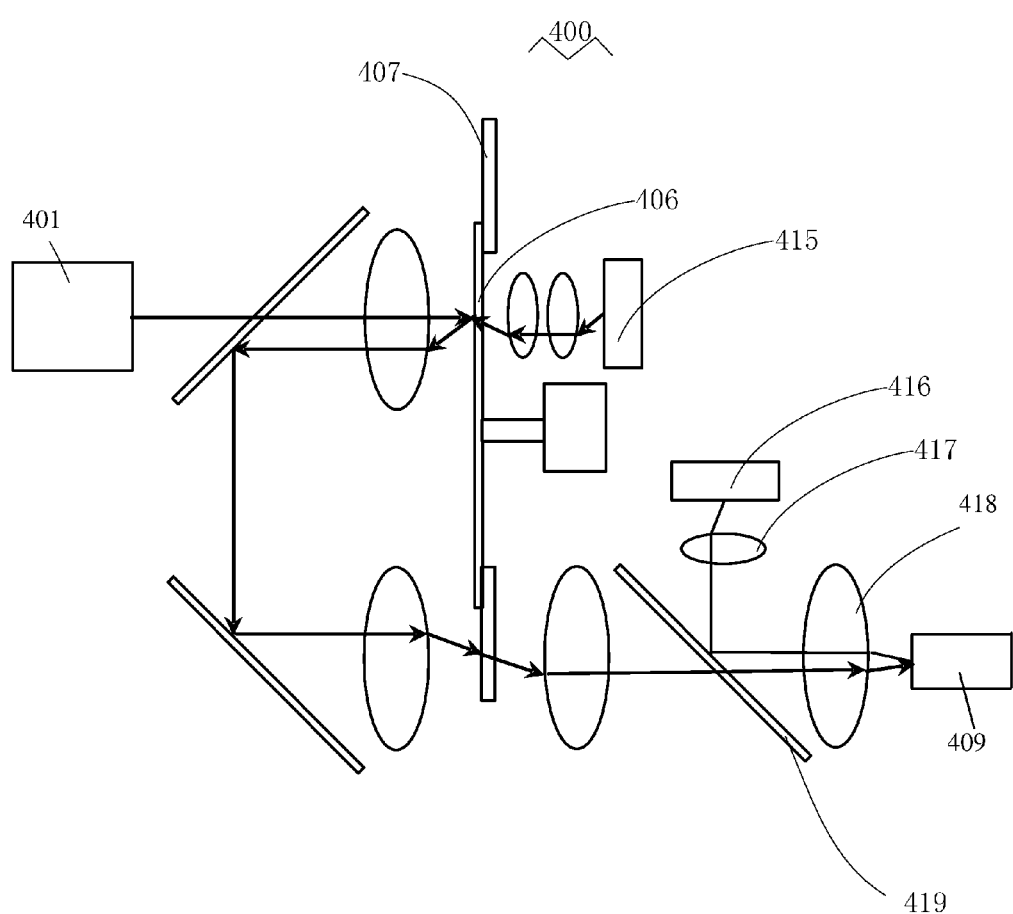
FIG. 7 illustrates the structure of a light source system according to a fourth embodiment of the present invention.

Referring to FIG. 7, FIG. 7 is a schematic structural view of the light source system according to the fourth embodiment of the present invention. The light source system 400 of the present embodiment and the light source system 300 shown in FIG. 5 and FIG. 6 differ in that: the excitation light source 401 of the present embodiment is an ultraviolet or blue excitation light source. At the same time, the wavelength conversion device 406 in the present embodiment is provided with a yellow wavelength conversion area, a green wavelength conversion area and a red light transmission area. So the excitation light source 401 is only used to excite the yellow wavelength conversion area and the green wavelength conversion area to generate yellow converted light and green converted light. The light source system 400 in the present embodiment further includes a blue illumination light source 416 in addition to the excitation light source 401 and the red illumination light source 415. The blue illumination light generated by the blue illumination light source 416 passes through the second optical assembly comprised of lenses 417 and 418 and dichroic mirror 419, is combined with the converted light filtered by the color filter device 407 and the red illumination light transmitted or filtered by the color filter device 407 into one light beam, which is incident on the light homogenization device 409 to be made uniform. In the present embodiment, the excitation light source 401, the red illumination light source 415 and the blue illumination light source 416 can also be turned on and off in a time-division manner similar to the third embodiment.

In the present embodiment, the red light outputted from the light source system 400 is supplied directly by the red illumination light source 415 and the blue light outputted from the light source system 400 is supplied directly by the blue illumination light source 416, which can avoid the problem of low conversion efficiency of the wavelength conversion materials, and is more suitable for the display field.

Figure 8:
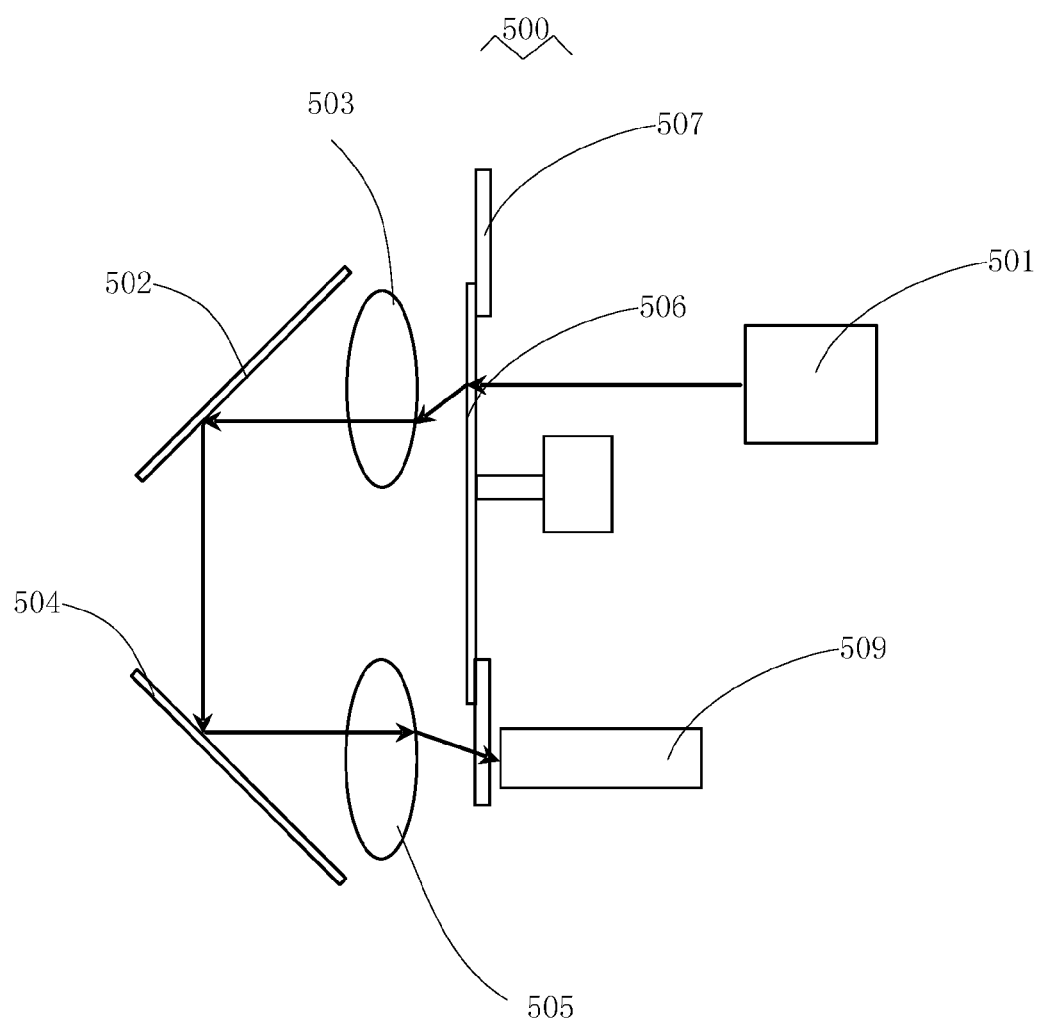
FIG. 8 illustrates the structure of a light source system according to a fifth embodiment of the present invention.

Referring to FIG. 8, FIG. 8 is a schematic structural view of the light source system according to the fifth embodiment of the present invention. The light source system 500 of the present embodiment and the light source system 100 shown in FIG. 1 and FIG. 2 differ in that: the wavelength conversion device 506 converts the excitation light generated by the excitation light source 501 into the converted light and transmits it. The converted light transmitted by the wavelength conversion device 506 is guided by the first optical assembly comprised of lenses 503 and 505 and reflecting mirror 502 and 504 and incident on the color filter area of the same color on the color filter device 507. After filtering by the color filter area it is incident on the light homogenization device 509.

In addition, the excitation light source 501 can also be a blue light source. A light transmission area can be further provided on the wavelength conversion device 506. The light transmission area is provided in the propagation path of the excitation light generated by the excitation light source 501 periodically and transmits it. After being transmitted by the light transmission area, the excitation light passes through the first optical assembly comprised of lenses 503 and 505 and reflecting mirror 502 and 504, and is guided to another light transmission area or color filter area on the color filter device 507 along the same propagation path as the converted light, to be is transmitted or filtered.

Figure 9:
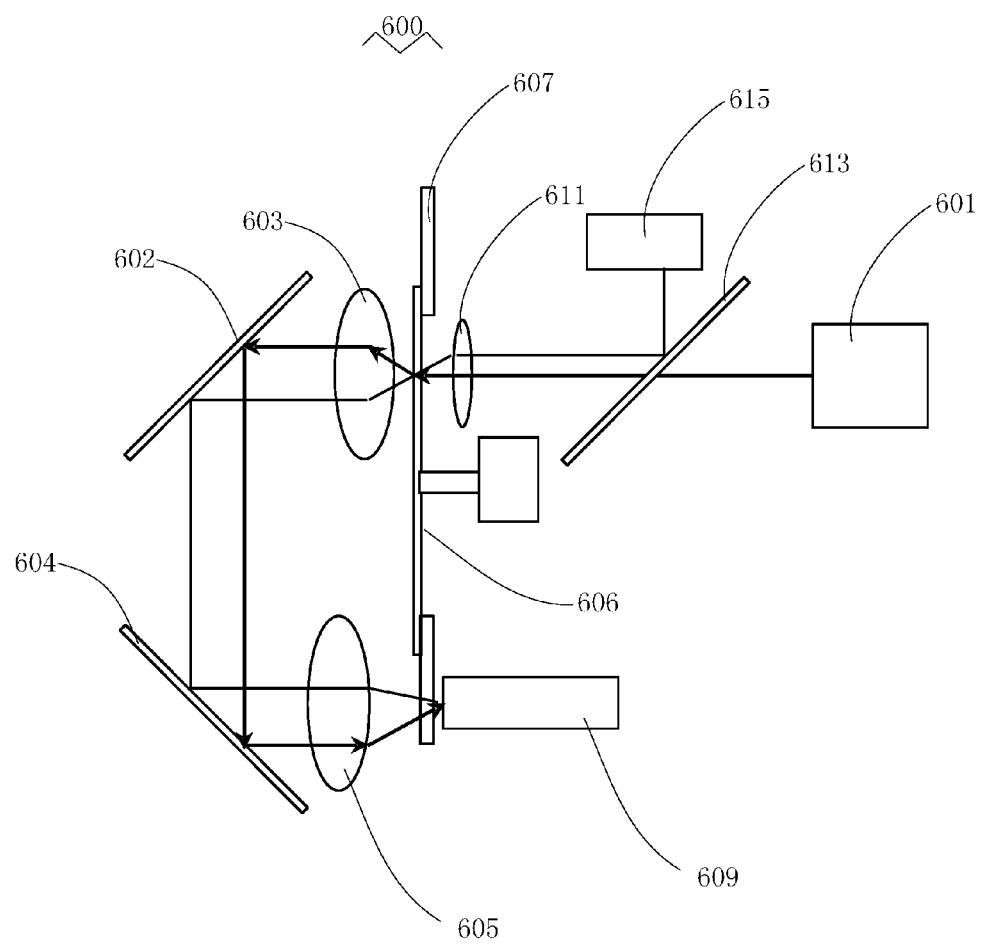
FIG. 9 illustrates the structure of a light source system according to a sixth embodiment of the present invention.

Referring to FIG. 9, FIG. 9 is a schematic structural view of the light source system according to the sixth embodiment of the present invention. The light source system 600 of the present embodiment and the light source system 500 shown in FIG. 8 differ in that: the light source system 600 of the present embodiment further includes, in addition to the excitation light source 601, a red illumination light source 615 in order to generate a red illumination light. The red illumination light source 615 and the excitation light source 601 are provided on the same side of the wavelength conversion device 606 and the color filter device 607. The red illumination light generated by the red light illumination light source 615 is reflected by the dichroic mirror 613, converged by the lens 611, then incident on the wavelength conversion device 606 along the same direction as the excitation light generated by the excitation light source 601. The excitation light generated by the excitation light source 601 is converted into the converted light by the wavelength conversion area of the wavelength conversion device 606, and is transmitted by the wavelength conversion device 606. The red illumination light generated by the red illumination light source 615 is transmitted directly by the red light transmission area of the wavelength conversion device 606. The converted light transmitted by the wavelength conversion device 606 and the red illumination light is guided by the first optical assembly comprised of reflecting mirror 602 and 604 and lenses 603 and 605, and incident on the color filter area and the red light transmission area of the color filter device 607. The converted light filtered by the color filter area and the red illumination light transmitted by the red light transmission area are further incident on the light homogenization device 609. In addition, the red light transmission area can be replaced by a red color filter area. In addition, the excitation light source 601 and the red illumination light source 615 in the present embodiment can also be turned on and off in a time-division manner similar to the third embodiment.

Figure 10:
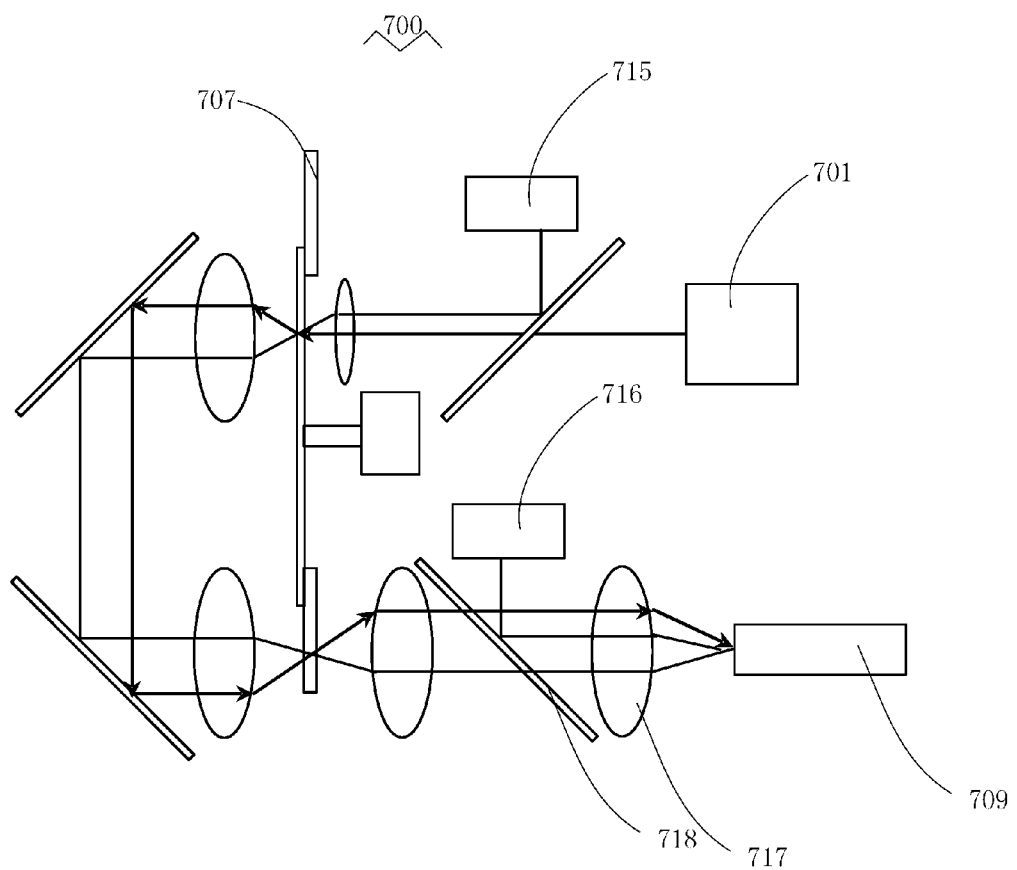
FIG. 10 illustrates the structure of a light source system according to a seventh embodiment of the present invention.

Referring to FIG. 10, FIG. 10 is a schematic structural view of the light source system according to the seventh embodiment of the present invention. The light source system 700 of the present embodiment and the light source system 600 shown in FIG. 9 differ in that: the light source system 700 of the present embodiment further includes a blue illumination light source 716 in addition to the excitation light source 701 and the red illumination light source 715. The blue illumination light generated by the blue illumination light source 716 passes through the second optical assembly comprised of lens 717 and dichroic mirror 718, and is combined with the converted light filtered by the color filter device 707 and the red illumination light filtered or transmitted by the color filter device 707 into one light beam, which is incident on the light homogenization device 709 to be made uniform. In the present embodiment, the excitation light source 701, the red illumination light source 715 and the blue illumination light source 716 can be turned on and off in a time-division manner similar to the third embodiment.

Figure 11:
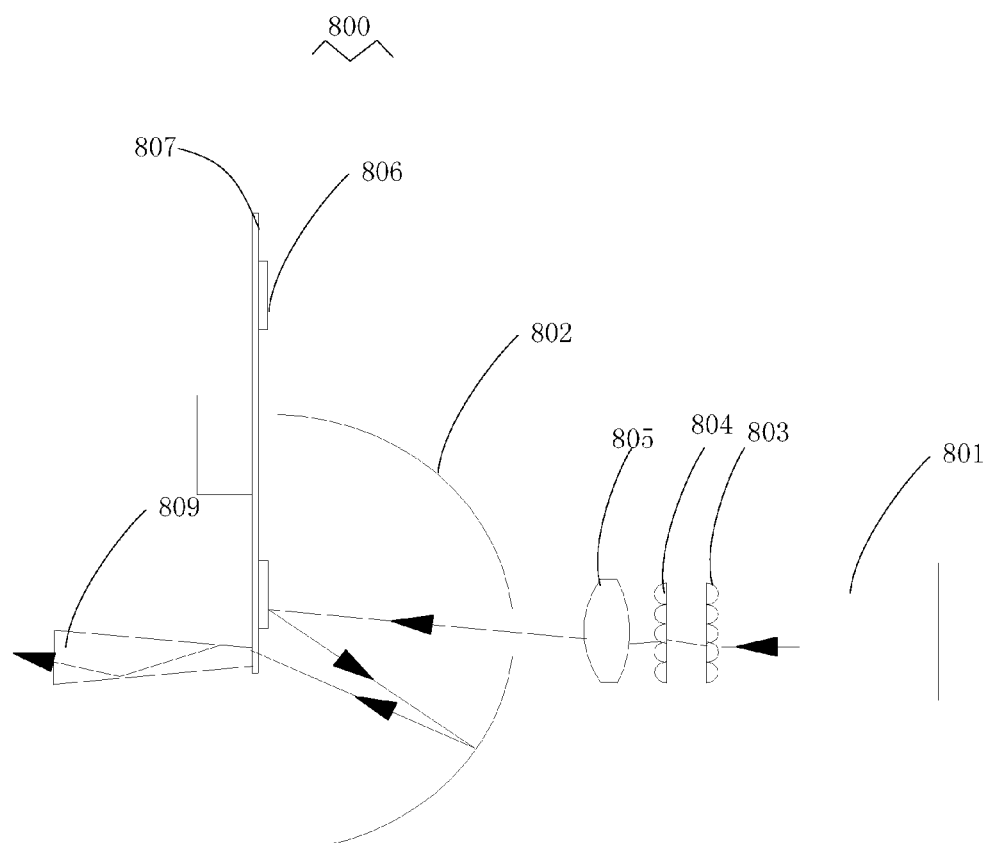
FIG. 11 illustrates the structure of a light source system according to an eighth embodiment of the present invention.

Referring to FIG. 11, FIG. 11 is a schematic structural view of the light source system according to the eighth embodiment of the present invention. The light source system 800 of the present embodiment and the light source system 100 shown in FIG. 1 and FIG. 2 differ in that: in the present embodiment the excitation light generated by the excitation light source 801 is converged by the fly eye lenses 803 and 804 and converging lens 805, then incident on the wavelength conversion device 806 through the light entrance port on the reflecting device 802. The converted light reflected by the wavelength conversion device 806 is then reflected by the reflecting device 802 and incident on the color filter device 807. The reflecting device 802 is semi-ellipsoidal or hemispherical and its reflecting surface faces inside. The converted light filtered by the color filter device 807 is further incident to the tapered light guide rod 809. When the reflecting device 802 is semi-ellipsoidal, the converted light from the vicinity of one focus point of the reflecting device 802 can be reflected to the vicinity of the other focus point; when the reflecting device 802 is hemispherical, if two points are located near the center of the sphere and symmetrical with respect to the center of the sphere, then the reflecting device 802 can approximately reflect the converted light from one symmetrical point to the other. In addition, in other embodiments, the reflecting device 802 can be provided without a light entrance port, and the excitation light source 801 and the reflecting device 802 are provided on the opposite sides of the wavelength conversion device 806. The excitation light generated by the excitation light source 801 is incident on the wavelength conversion device 806 and the converted light is then transmitted through the wavelength conversion device to the reflecting device 802.

It's worth noting that, under the reflection of the reflecting device 802, the light spot formed by the excitation light generated by the excitation light source 801 incident on the wavelength conversion device 806 and the light spot formed by the converted light incident on the color filter device 807 are located at 0 degree from each other with respect to the center of the ring structure of the wavelength conversion device 806 and the color filter device 807; thus, the wavelength conversion area and color filter area of the same color on the wavelength conversion device 806 and color filter device 807 also need to be set at 0 degree from each other with respect to the center of the ring structure of the wavelength conversion device 806 and the color filter device 807.

Of course, in other embodiments, through appropriate optical arrangement, the light spot formed by the excitation light incident to the wavelength conversion device 806 and the light spot formed by the converted light incident to the color filter device 807 can be set at any angle from each other with respect to the center of the ring structure of the wavelength conversion device 806 and the color filter device 807, so the wavelength conversion area and the color filter area of the same color on the wavelength conversion device 806 and color filter device 807 can be set at any angle with respect to the center of the ring structure of the wavelength conversion device 806 and the color filter device 807.

Figure 12:
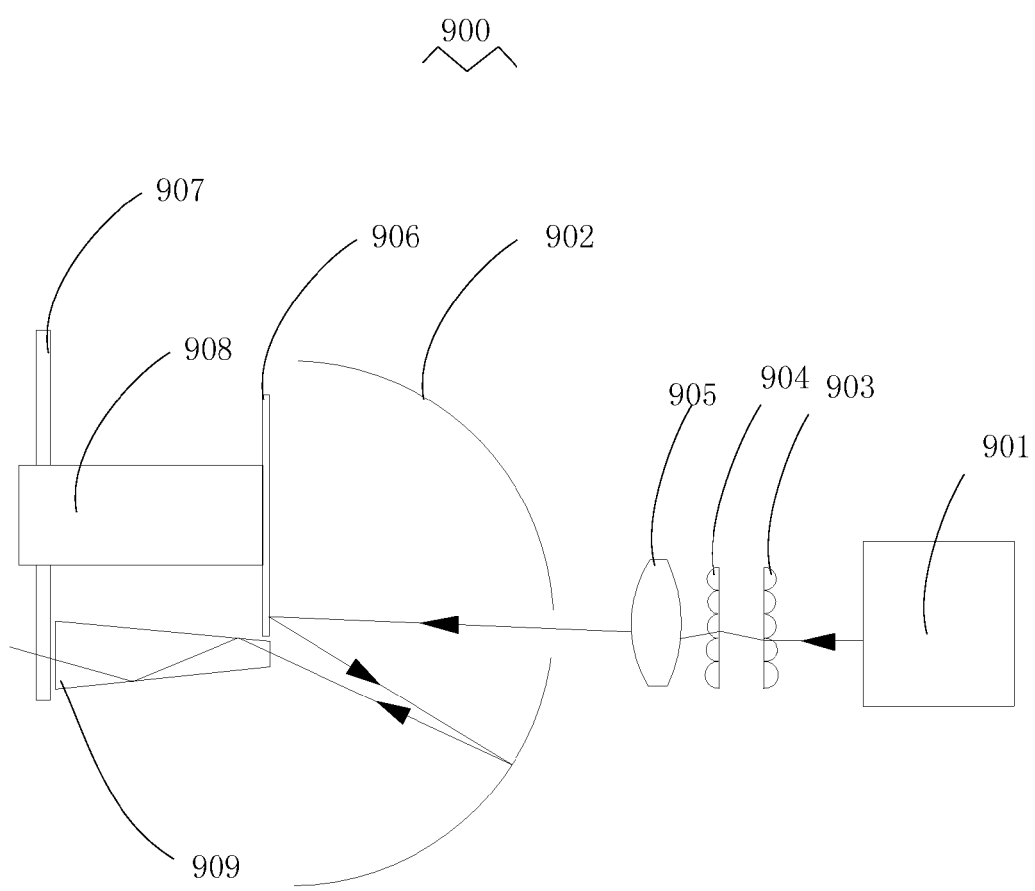
FIG. 12 illustrates the structure of a light source system according to a ninth embodiment of the present invention.

Referring to FIG. 12, FIG. 12 is a schematic structural view of the light source system according to the ninth embodiment of the present invention. The light source system 900 of the present embodiment and the light source system 800 shown in FIG. 11 differ in that: the wavelength conversion device 906 and the color filter device 907 are fixed coaxially by the bracket 908, and are spaced apart along the axial direction. A tapered light guide rod 909 is provided between the wavelength conversion device 906 and the color filter device 907. The excitation light generated by the excitation light source 901 is converged by the fly eye lens 903 and 904 and the converging lens 905, then incident on the wavelength conversion device 906 through the light entrance port on the reflecting device 902. The converted light reflected by the wavelength conversion device 906 is incident on the reflecting device 902 and reflected. The converted light reflected by the reflecting device 902 is first incident to the light guide rod 909. The light guide rod 909 collects the converted light in order to reduce the divergence angle of the converted light. After guided by the light guide rod 909, the converted light is incident on the color filter device 907, so that the incident angle on the color filter device 907 is smaller, and the filtering effect is improved. In the present embodiment, the light guide rod 909 can also be replaced by other optical device that is able to achieve the functions described above. Further, in the present embodiment, if the wavelength conversion device 906 is a transmission type, the reflecting device 902 can be omitted, and then the converted light is transmitted by the wavelength conversion device 906 and incident on the light guide rod 909 directly.

As described above, in the embodiment shown in FIG. 11 and FIG. 12, an illumination light source can be further provided in addition to the excitation light sources 801 and 901, such as a red illumination light source or a blue illumination light source.

Figure 13:
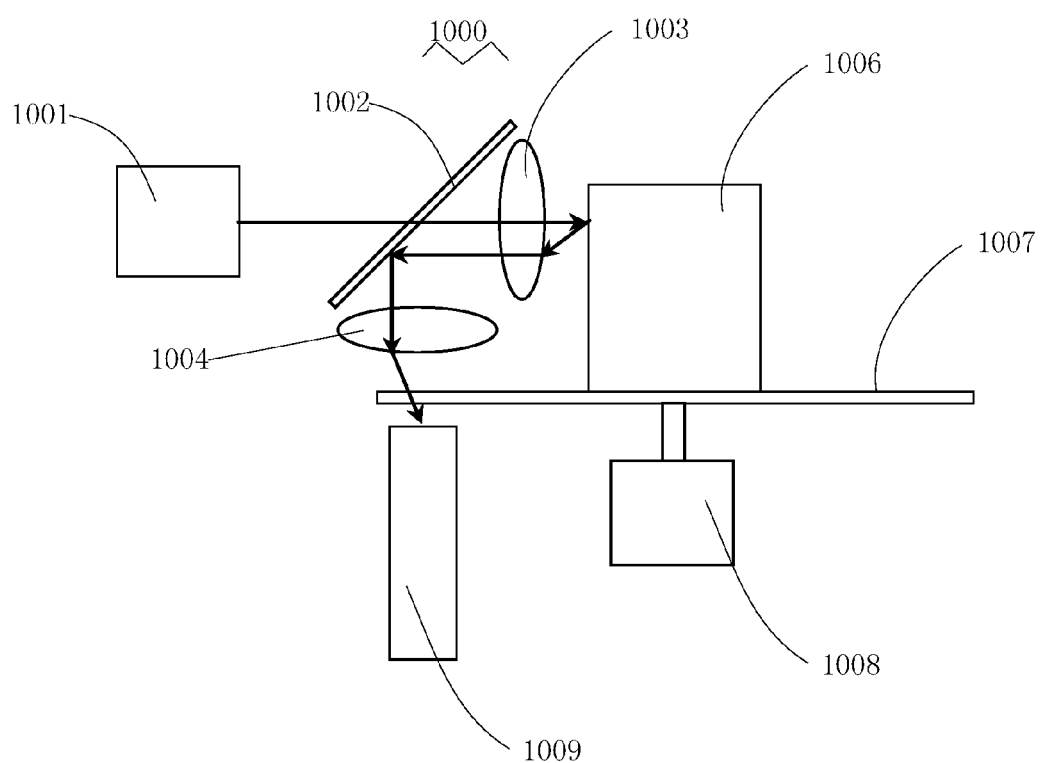
FIG. 13 illustrates the structure of a light source system according to a tenth embodiment of the present invention.

Referring to FIG. 13, FIG. 13 is a schematic structural view of the light source system according to the tenth embodiment of the present invention. The light source system 1000 of the present embodiment and the light source system 100 shown in FIG. 1 and FIG. 2 differ in that: the wavelength conversion device 1006 of the present embodiment is a cylindrical structure, and the wavelength conversion areas are provided on the outside surface of the sidewall of the cylindrical structure. The color filter device 1007 has a ring structure. The wavelength conversion device 1006 and the color filter device 1007 are further coaxially fixed on the rotating shaft of the driving device 1008, and rotate coaxially and synchronously under the driving of the driving device 1008.

In the working process of the light source system 1000 according to the present embodiment, the excitation light generated by the excitation light source 1001 is transmitted by the dichroic mirror 1002, converged by the lens 1003, then incident on the outside surface of the sidewall of the wavelength conversion device 1006. The wavelength conversion areas on the outside surface of the sidewall of the wavelength conversion device 1006 convert the excitation light into the converted light and reflect it. After reflected by the wavelength conversion device 1006, the converted light is guided by the first optical assembly which is comprised of lens 1003 and 1004 and the dichroic mirror 1002, and incident on the color filter device 1007. The color filter areas on the color filter device 1007 are provided outside of the cylindrical structure of the wavelength conversion device 1006, so that the converted light can be incident on them and filtered to improve the color purity. After filtered by the color filter areas of the color filter device 1007, the converted light is further incident on the light homogenization device 1009 to be made uniform. In other embodiments, the wavelength conversion device 1006 can also transmit the converted light to the color filter device 1007.

Figure 14:
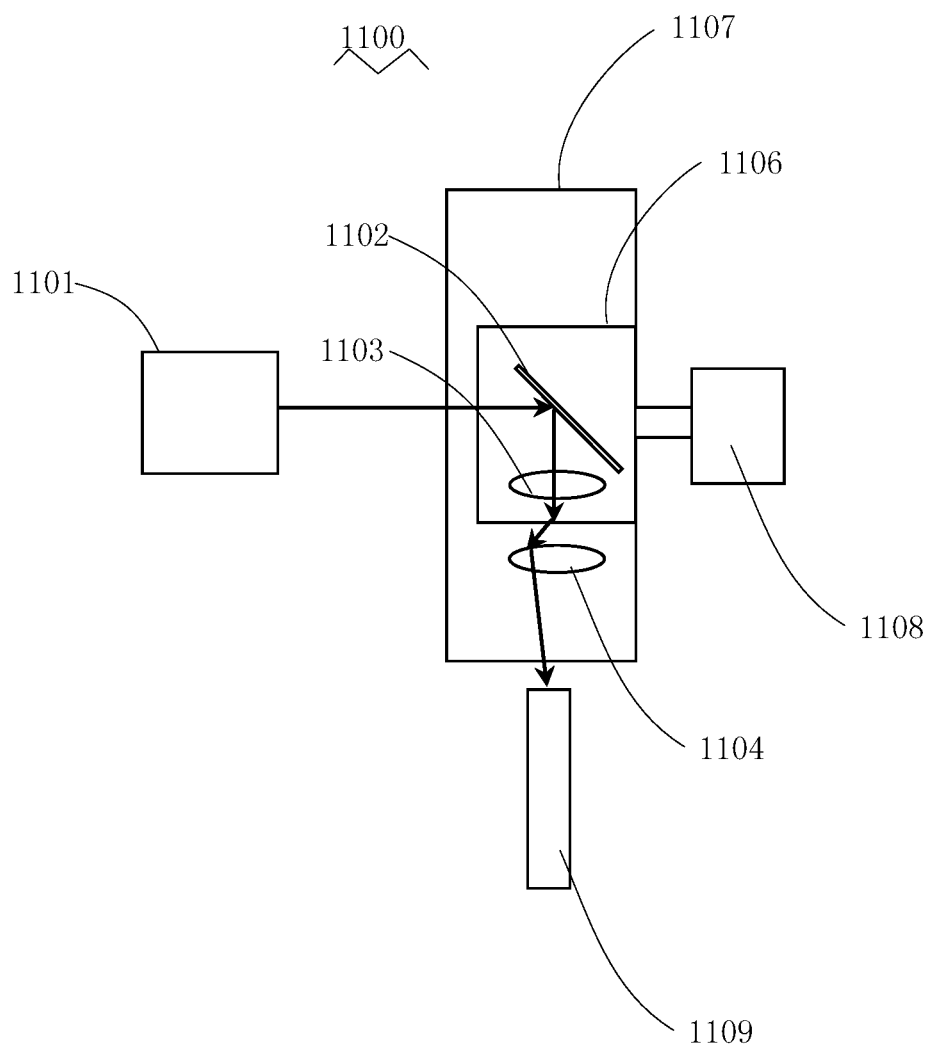
FIG. 14 illustrates the structure of a light source system according to an eleventh embodiment of the present invention.

Referring to FIG. 14, FIG. 14 is a schematic structural view of the light source system according to the eleventh embodiment of the present invention. The light source system 1100 of the present embodiment and the light source system 100 shown in FIG. 1 and FIG. 2 differ in that: in the present embodiment the wavelength conversion device 1106 and the color filter device 1107 are two cylindrical structures which are fixed coaxially and nested within each other, and the wavelength conversion areas and the first color filter areas are provided on the sidewalls of the two cylindrical structures respectively. The color filter device 1107 is located outside of the wavelength conversion device 1106. The wavelength conversion device 1106 and the color filter device 1107 are further coaxially fixed on the rotating shaft of the driving device 1108, and rotate coaxially and synchronously under the driving of the driving device 1108.

In the working process of the light source system 1100 according to the present embodiment, the excitation light generated by the excitation light source 1101 is reflected by the reflecting mirror 1102, converged by the lens 1103, then incident on the wavelength conversion device 1106. The wavelength conversion areas of the wavelength conversion device 1106 convert the excitation light into the converted light and transmit it. After being transmitted by the wavelength conversion device 1106, the converted light is guided by the first optical assembly comprised of lens 1104 and incident on the color filter device 1107. The color filter areas of the color filter device 1107 filter the converted light to improve its color purity. After filtering by the color filter areas of the color filter device 1107, the converted light is further incident on the light homogenization device 1109 to be made uniform.

Figure 15:
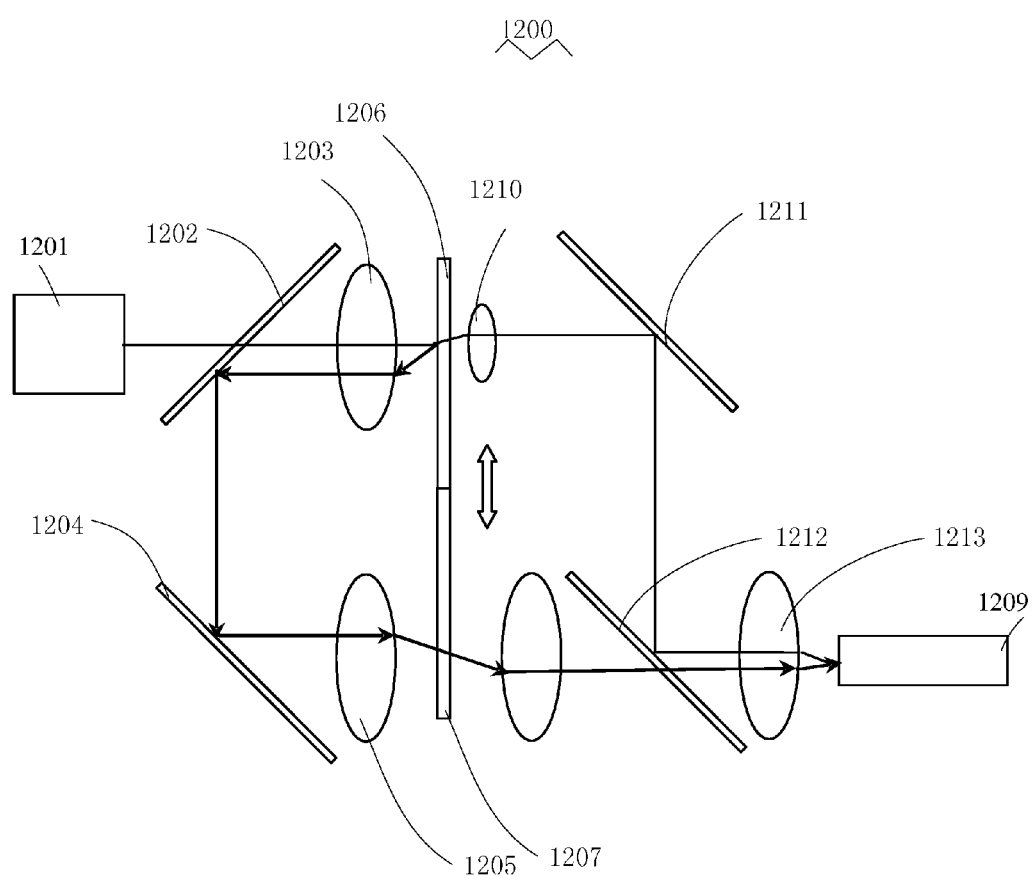
FIG. 15 illustrates the structure of a light source system according to a twelfth embodiment of the present invention.
Figure 16:
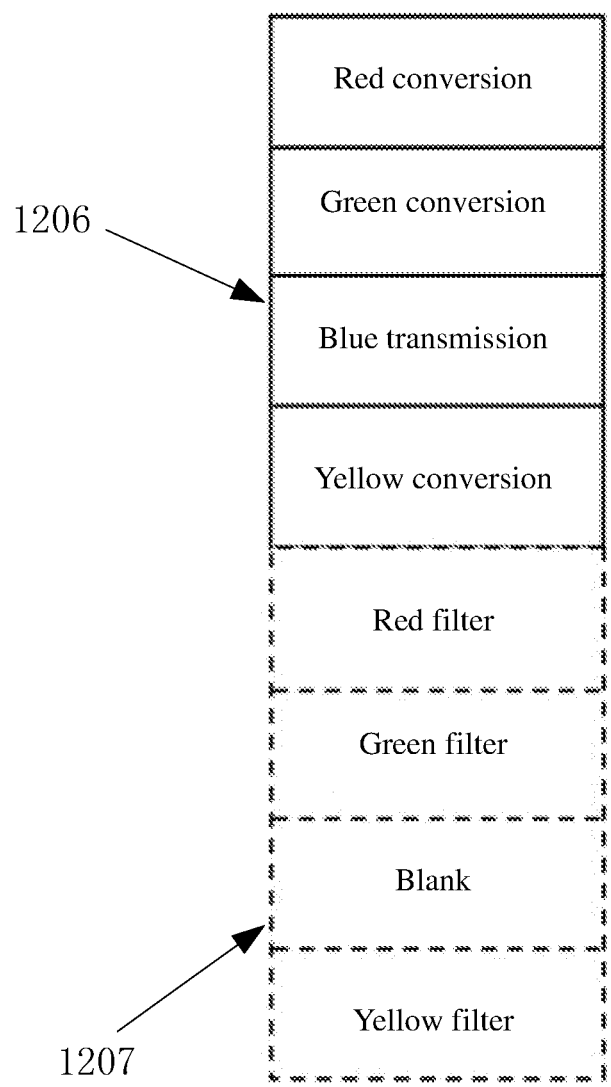
FIG. 16 is a front view of the wavelength conversion device and the color filter device of the light source system shown in FIG. 15.

Referring to in FIG. 15 and FIG. 16, FIG. 15 is a schematic structural view of the light source system according to the twelfth embodiment of the present invention, and FIG. 16 is the front view of the wavelength conversion device and the color filter device of the light source system shown in FIG. 15. The light source system 1200 of the present embodiment and the light source system 200 shown in FIG. 3 and FIG. 4 differ in that: in the present embodiment, the wavelength conversion device 1206 and the color filter device 1207 are two strip structures adjoined side by side, where the wavelength conversion areas and the first color filter areas are arranged side by side in the two strip structures. In the present embodiment, the wavelength conversion device 1206 includes a red wavelength conversion area, a green wavelength conversion area, a blue light transmission area and a yellow wavelength conversion area which are arranged side by side sequentially from top to bottom. The color filter device 1207 includes a red color filter area, a green color filter area, a blank area and a yellow color filter area which are arranged side by side sequentially from top to bottom.

The wavelength conversion device 1206 and the color filter device 1207 move in an oscillating linear translational motion under the driving of a suitable driving device (e.g. a linear motor), so that the red wavelength conversion area, the green wavelength conversion area, the blue light transmission area and the yellow wavelength conversion area of the wavelength conversion device 1206 are periodically provided in the propagation path of the blue excitation light generated by the excitation light source 1201. The wavelength conversion areas convert the blue excitation light incident on them into converted light of corresponding colors and reflect them, and the blue light transmission area transmits the blue excitation light incident on it. The blue light transmission area can be provided with an appropriate scattering material to destroy the collimation of the blue excitation light. The converted light reflected by the wavelength conversion device 1206 is guided by the first optical assembly comprised of lenses 1203 and 1205, dichroic mirror 1202 and reflecting mirror 1204, then incident on the color filter area of corresponding color on the color filter device 1207, so that it is filtered by the color filter area to improve its color purity. The blue excitation light transmitted by the wavelength conversion device 1206 is guided by the second optical assembly comprised of lens 1210 and 1213, reflecting mirror 1211 and dichroic mirror 1212, and combined with the converted light filtered by the color filter device 1207 into one beam of light, which is incident to the light homogenization device 1209 to be made uniform. In the present embodiment, the structure of the wavelength conversion device 1206 and the color filter device 1207 can also be applied to the other embodiments described above, which is not described.

The present invention further provides a light source assembly constituted by the wavelength conversion device and the color filter device which are described in the above embodiments.

In summary, in the light source system and the light source assembly of the present invention, the color filter device and the wavelength conversion device are fixed with respect to each other, and they are driven by a same driving device, which can bring the advantages that: the structure is simple, it is easy to implement, and the synchronization effect is excellent.

The invention is not limited to the above described embodiments. Various modification and variations can be made in the light source device and system of the present invention based on the above descriptions. Thus, it is intended that the present invention cover modifications and variations that come within the scope of the appended claims and their equivalents, as well as the direct or indirect application of the embodiment in other related technical fields.

What is claimed is:

1. A light source system, comprising:
an excitation light source for generating an excitation light;
a wavelength conversion device including at least one wavelength conversion area, the wavelength conversion area being disposed in a propagation path of the excitation light from the excitation light source at least some of the time, wherein the wavelength conversion area converts the excitation light into a converted light and transmits the converted light; and
a red illumination light source for generating a red illumination light, wherein the red illumination light and the converted light are output along a common optical path,
wherein the excitation light and the red illumination light are incident on a same side of the wavelength conversion device along another common optical path.

2. The light source system of claim 1,
wherein the wavelength conversion device further includes a red light transmission area,
wherein the light source system further includes a driving device for driving the wavelength conversion device, and as the wavelength conversion device is driven by the driving device, the wavelength conversion area and the red light transmission area of the wavelength conversion device are sequentially and periodically disposed on optical paths of the excitation light generated by the excitation light source and the red illumination light generated by the red illumination light source,
wherein the wavelength conversion area converts the excitation light incident on it into a converted light and transmits the converted light,
wherein the red light transmission area transmits the red illumination light incident on it, and
wherein the converted light and the red illumination light are output from the wavelength conversion device from a side that is opposite the side where the excitation light source is disposed on.

3. The light source system of claim 2, further comprising a first dichroic mirror for combining light paths of the excitation light from the excitation light source and the red illumination light form the red illumination light source.

4. The light source system of claim 2, wherein the excitation light source is a blue excitation light source for generating a blue excitation light,
wherein the wavelength conversion device includes a blue light transmission area;
wherein as the wavelength conversion device is driven by the driving device, the wavelength conversion area, the red light transmission area and the blue light transmission area of the wavelength conversion device are sequentially and periodically disposed on optical paths of the blue excitation light generated by the excitation light source and the red illumination light generated by the red illumination light source, and wherein the blue light transmission area transmits the blue excitation light incident thereon, and
wherein the blue excitation light and the converted light are output from the wavelength conversion device along the common optical path.

5. The light source system of claim 2, further comprising:
a blue illumination light source for generating a blue illumination light; and
an optical assembly, for combining the optical paths of the converted light and the red illumination light output from the wavelength conversion device and the blue illumination light generated by the blue illumination light source.

6. The light source system of claim 5, wherein the optical assembly includes a second dichroic mirror,
wherein the converted light and the red illumination light output from the wavelength conversion device are incident on one side of the second dichroic mirror,
wherein the blue illumination light from the blue illumination light source is incident on another side of the second dichroic mirror, and
wherein the second dichroic mirror combines optical paths of the converted light, the red illumination light and the blue illumination light.

7. The light source system of claim 6, wherein the optical assembly includes a reflecting mirror set, which includes at least one reflecting mirror,
wherein the reflecting mirror set reflects the converted light and the red illumination light from the wavelength conversion device to the second dichroic mirror.

8. The light source system of claim 5, wherein the excitation light source, the red illumination light source and the blue illumination light source are controlled to turn on at different times, and at any given time, only one of the excitation light, the blue illumination light and the red illumination light is generated.

9. The light source system of claim 5, further comprising:
a light homogenization device, for homogenizing lights that has been combined by the optical assembly.

10. The light source system of claim 2, wherein the red light transmission area is a red filter area.

11. The light source system of claim 2, wherein the red light transmission area includes a light scattering material.

12. The light source system of claim 1, wherein the excitation light source is a UV excitation light source.

13. The light source system of claim 12, wherein the wavelength conversion area includes a blue wavelength conversion area.

14. The light source system of claim 1, wherein the wavelength conversion area includes at least one of a green wavelength conversion area and a yellow wavelength conversion area.

15. The light source system of claim 1, wherein the excitation light source is a blue excitation light source for generating a blue excitation light,
wherein the wavelength conversion device includes a blue light transmission area;
wherein as the wavelength conversion device is driven by the driving device, the wavelength conversion area and the blue light transmission area of the wavelength conversion device are sequentially and periodically disposed on optical paths of the blue excitation light generated by the excitation light source, and wherein the blue light transmission area transmits the blue excitation light incident thereon, and
wherein the blue excitation light and the converted light are output from the wavelength conversion device along the common optical path.

16. The light source system of claim 15, wherein the blue light transmission area includes a light scattering material.

17. The light source system of claim 1, further comprising a blue illumination light source for generating a blue illumination light, and
wherein the blue illumination light and the converted light are output along the common optical path.

18. A projection system, comprising the light source system of claim 1.

* * * * *